May 13, 1952     R. H. EVANS ET AL     2,596,953

FURNACE CHAMBER

Filed March 30, 1946     12 Sheets-Sheet 1

Inventors
Richard H. Evans &
Leslie P. Purple
By
Attorney

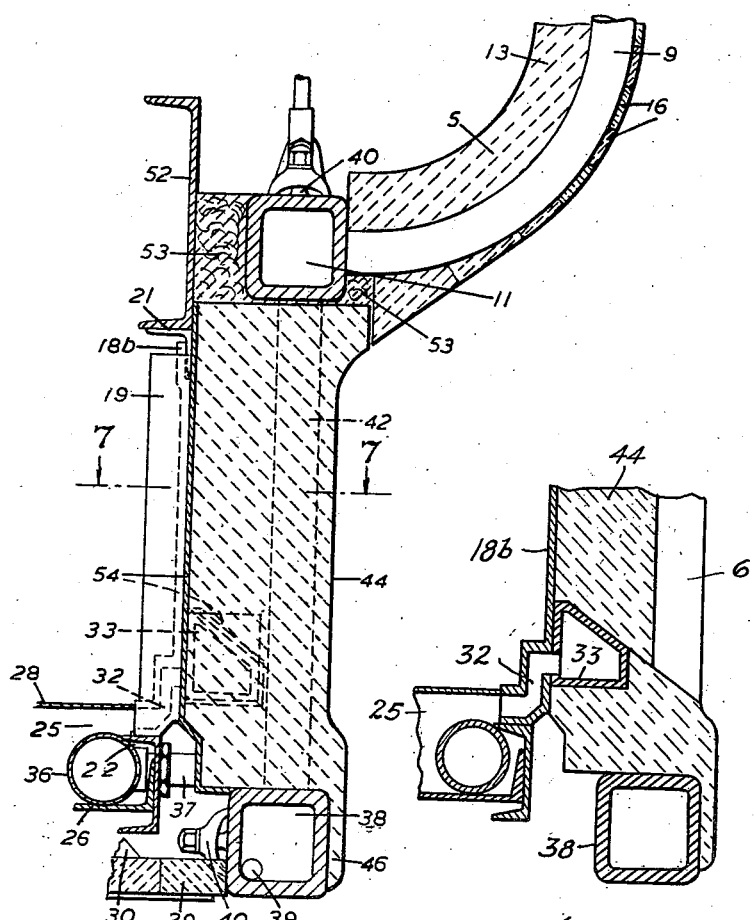

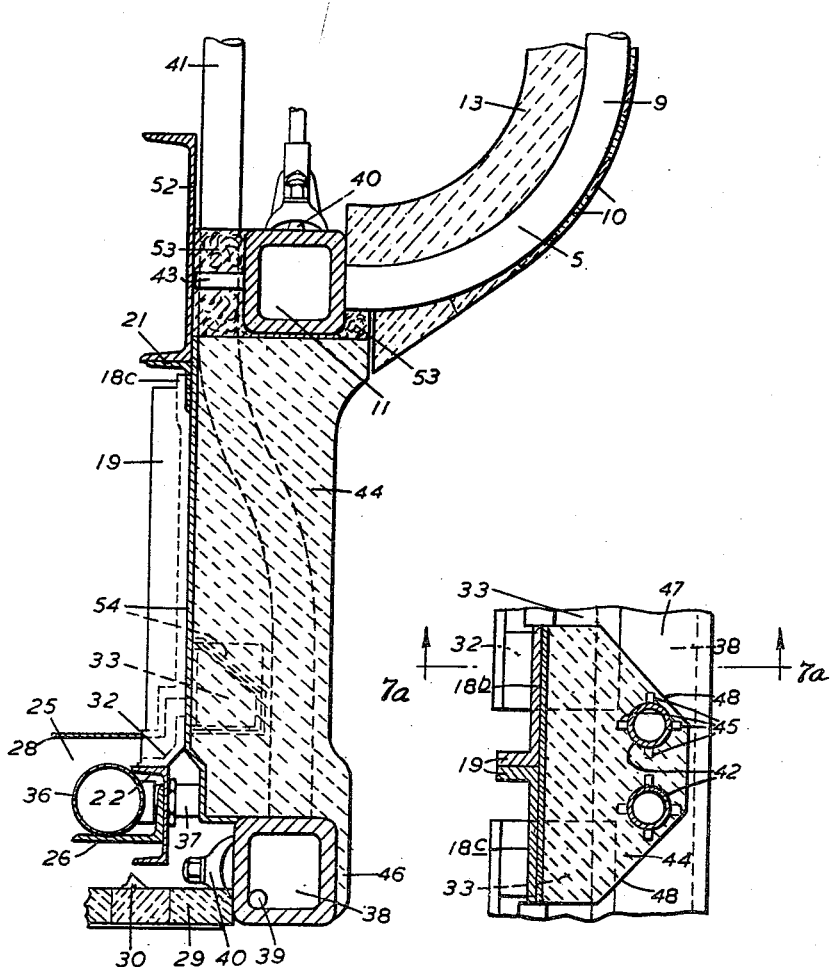

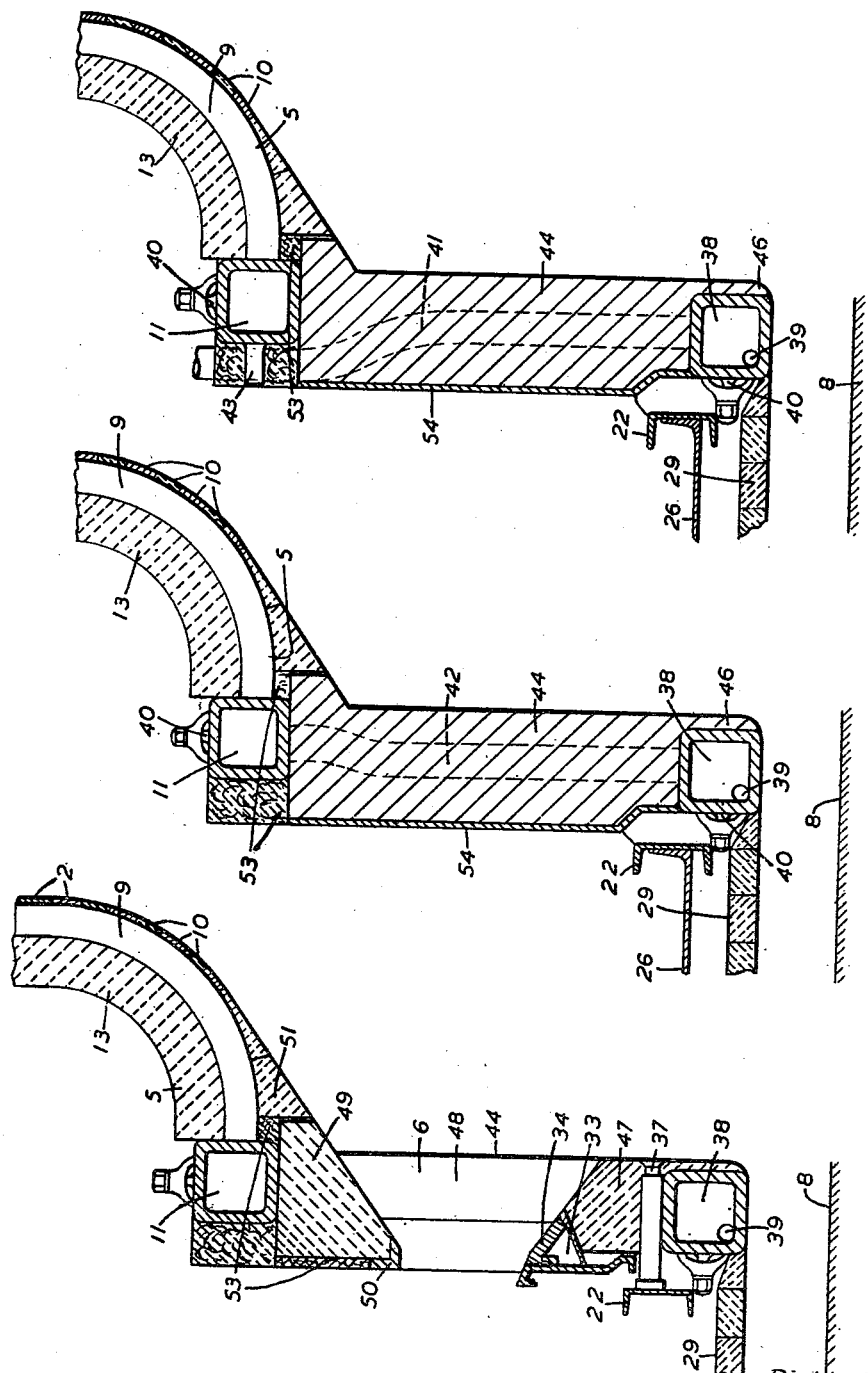

May 13, 1952 R. H. EVANS ET AL 2,596,953
FURNACE CHAMBER
Filed March 30, 1946 12 Sheets-Sheet 7
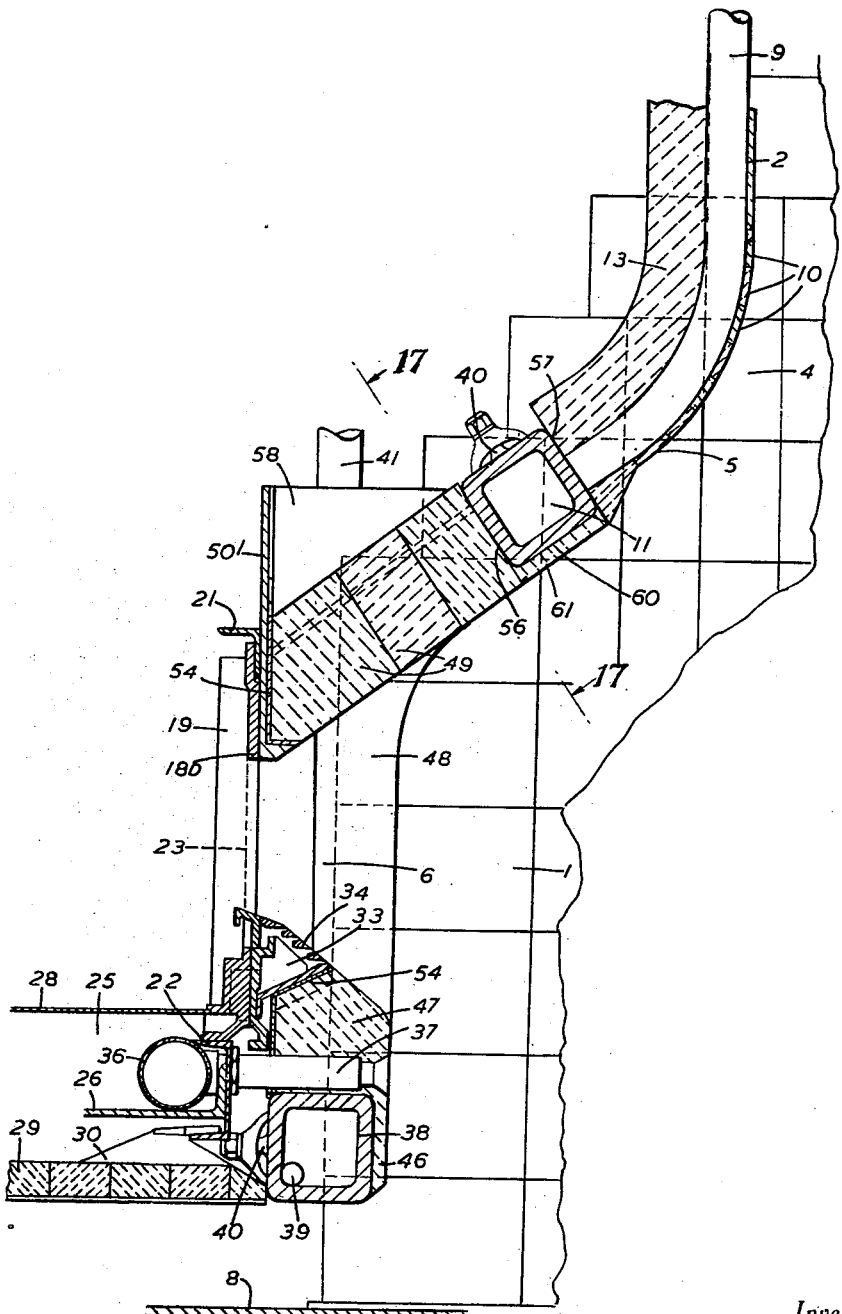
Fig. 13
Inventors
Richard H. Evans &
Leslie P. Purple
By 
Attorney

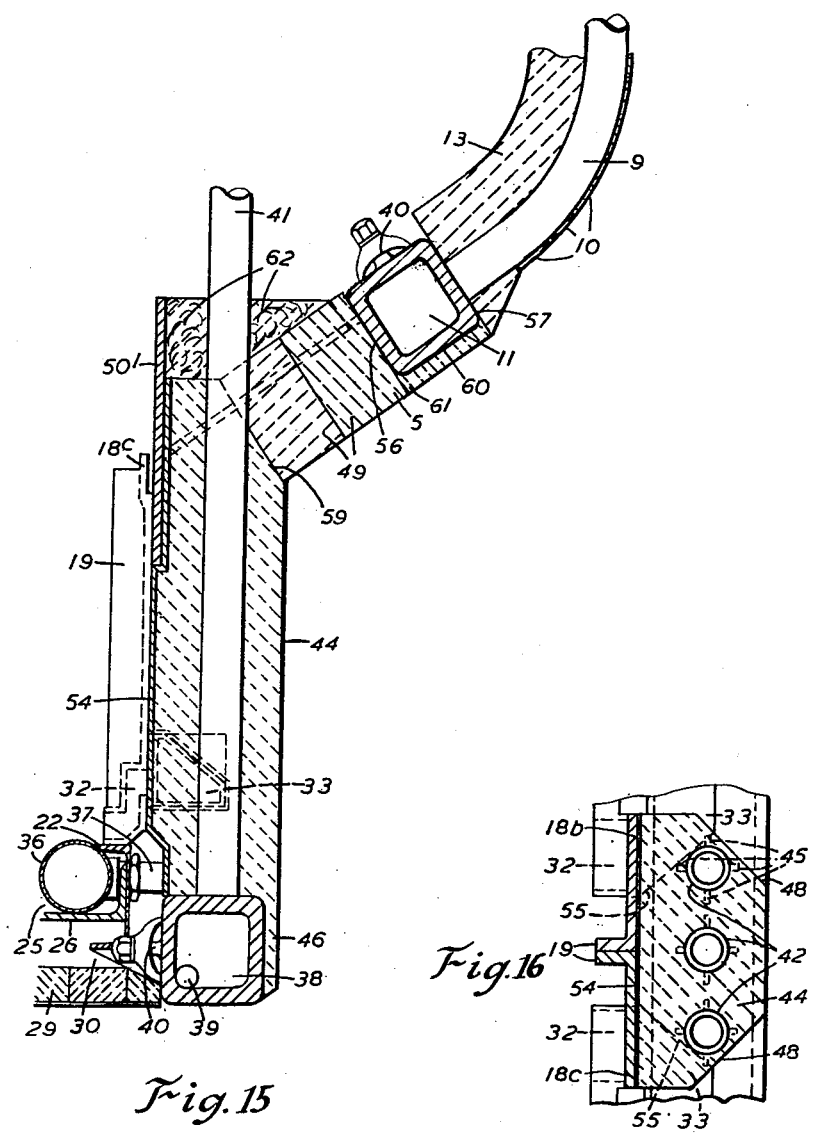
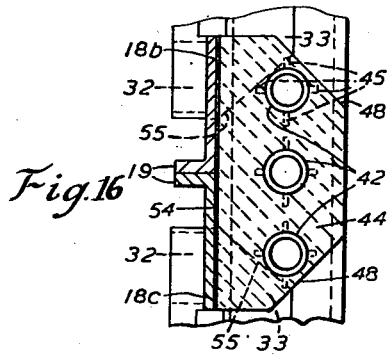
Fig. 15
Fig. 16
Inventors
Richard H. Evans &
Leslie P. Purple
By
Attorney

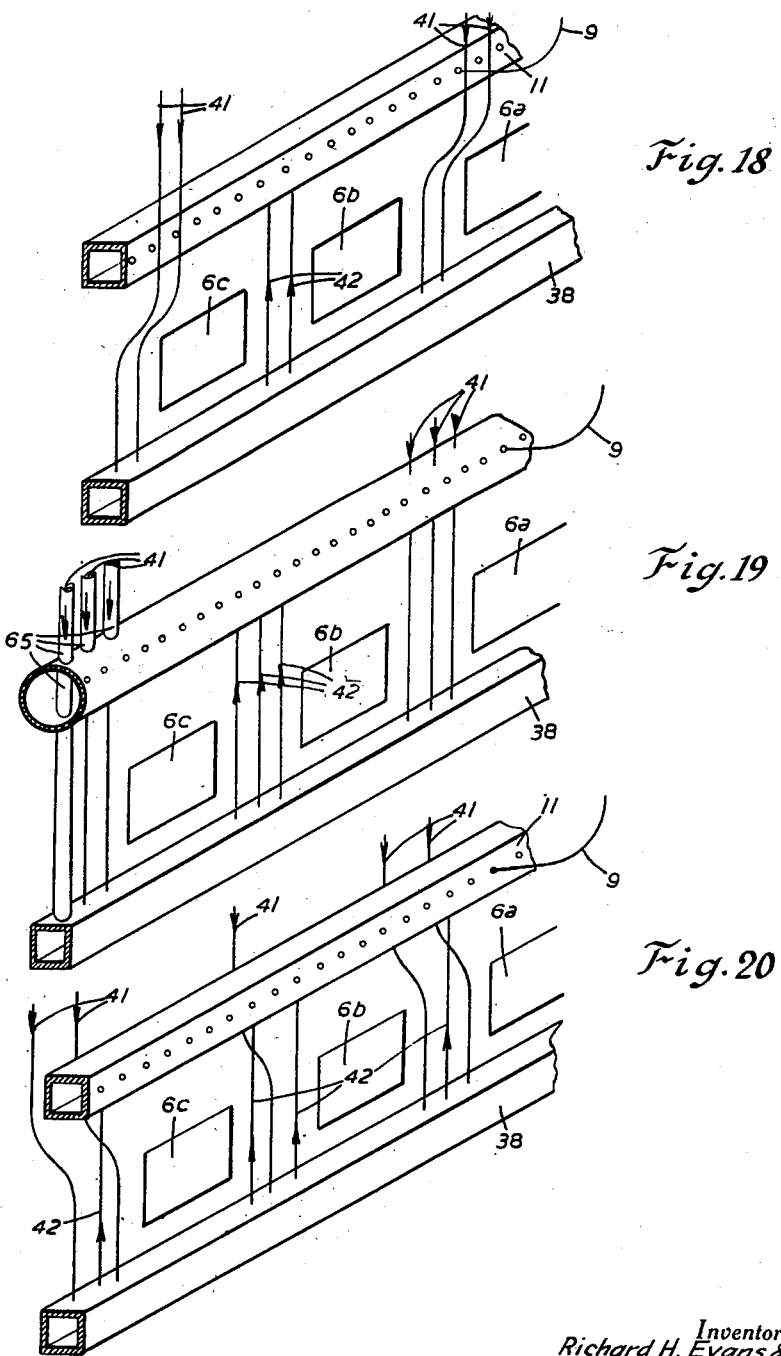

May 13, 1952 R. H. EVANS ET AL 2,596,953
FURNACE CHAMBER
Filed March 30, 1946 12 Sheets-Sheet 12

Inventors
Richard H. Evans &
Leslie P. Purple
By
Attorney

Patented May 13, 1952

2,596,953

UNITED STATES PATENT OFFICE 2,596,953

FURNACE CHAMBER

Richard Henry Evans and Leslie Percy Purple, London, England, assignors to The Babcock & Wilcox Company, Rockleigh, N. J., a corporation of New Jersey Application March 30, 1946, Serial No. 658,396
In Great Britain April 14, 1945

12 Claims. (Cl. 122—235)

This invention relates to furnace chambers of the kind including a front wall formed with a plurality of openings for the passage into the furnace chamber of fuel thrown by the fuel distributor mechanism of a spreader stoker extending along and adjacent the outer face of the wall. In such a furnace chamber a water wall has been provided to screen the front wall above the openings, but hitherto the provision of water cooled screening means at the portion of the front wall between the openings has been considered impracticable on account of the complex of parts extending along and beyond the front of the furnace chamber and providing for the supply of fuel and air for combustion, the operation and control of the gear for delivering the fuel to the furnace chamber and the necessary access and the consequent difficulty or apparent impossibility of distributing water to water tubes at the sides of the openings. As a consequence, the parts of the front wall at the sides of the openings have been lined with refractory applied in plastic condition or in the form of refractory bricks, but such refractory constructions require frequent renewals.

An object of the invention therefore is to provide a front wall screening means whereby the foregoing difficulties are overcome. In general, the form of screening means contemplated is of a tubular, liquid cooled construction arranged to operate throughout with natural circulation of the cooling medium and having both downcomer and riser elements at the sides of the openings behind the spreader stoker assembly.

An object is also to provide a tubular screening means adaptable to various details of front wall construction and having elements so arranged as to ensure proper circulation of the cooling medium downwardly and upwardly through the respective elements and thereby provide adequate cooling of parts of the front wall at the sides of the fuel admission openings.

The invention will now be described, by way of example, with reference to the accompanying drawings in which:

Figures 4, 5 and 6 are sectional side views taken on the lines IV—IV, V—V and VI—VI respectively of Figure 2;

Figure 7 is a sectional plan view taken on the line VII—VII of Figure 5;

Figure 7a is a sectional side view taken on line 7a—7a of Fig. 7;

Figures 8, 9 and 10 are views respectively similar to Figures 4, 5 and 6 but illustrating a modification;

Figures 13, 14 and 15 are sectional side views taken on the lines XIII—XIII, XIV—XIV and XV—XV respectively of Figure 11;

Figure 16 is a sectional plan view taken on the line XVI—XVI of Figure 14;

Figure 17 is a section taken on the line XVII—XVII of Figure 13 and looking in the direction of the arrows; and Figures 18 to 24 are diagrammatic perspective views illustrating various modifications of the headers and tubes of the front furnace wall adjacent the openings for the passage of fuel into the furnace chamber. For the sake of clarity, most of the riser tube lengths above the openings are omitted.

Figure 1:
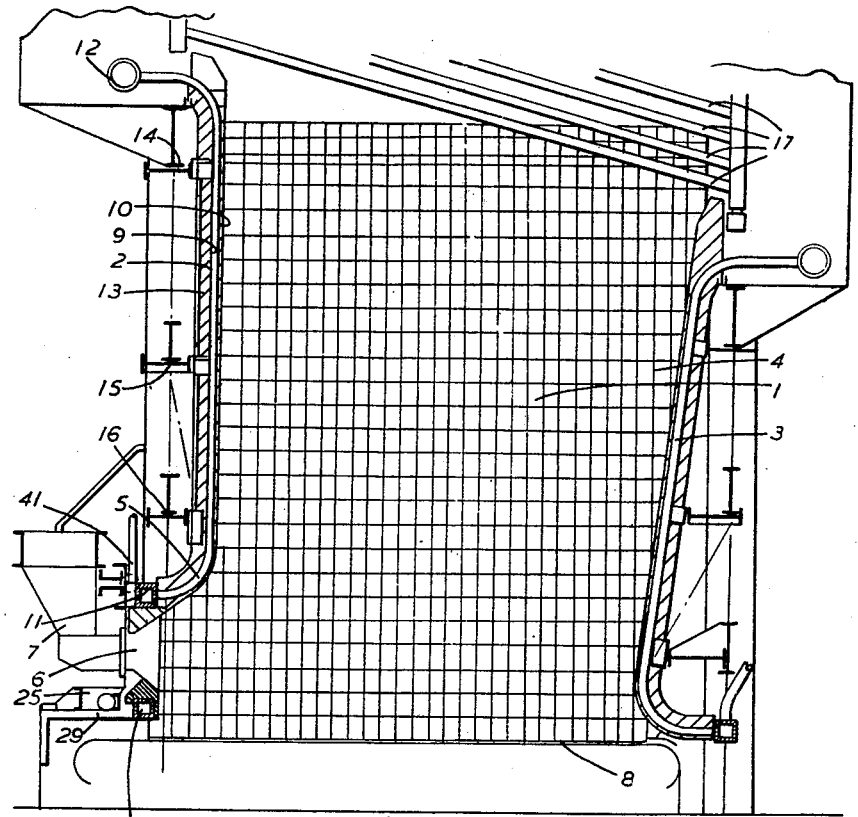
Figure 1 is a sectional side view of a water tube boiler furnace arranged to be fired by means of a spreader stoker.
Figure 2:
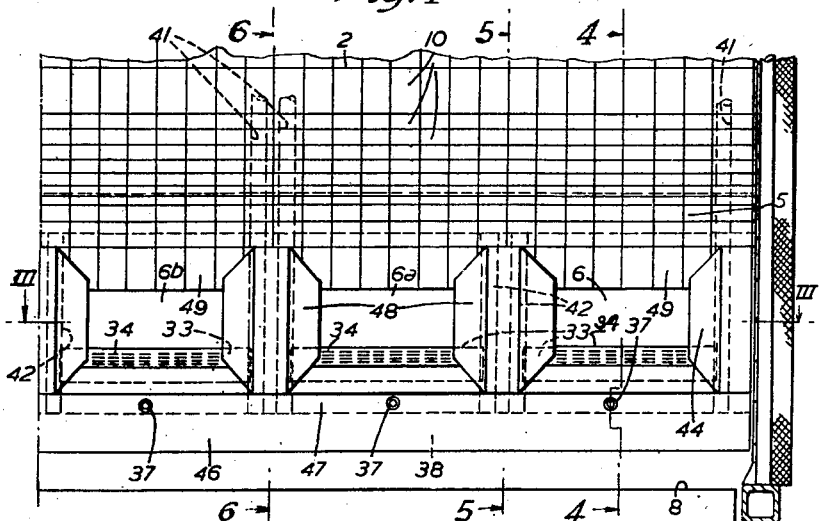
Figure 2 is a view in section through a side wall of the furnace, looking towards the front wall of the furnace and showing the part of the front wall adjacent the grate over one half the width of the furnace.
Figure 3:
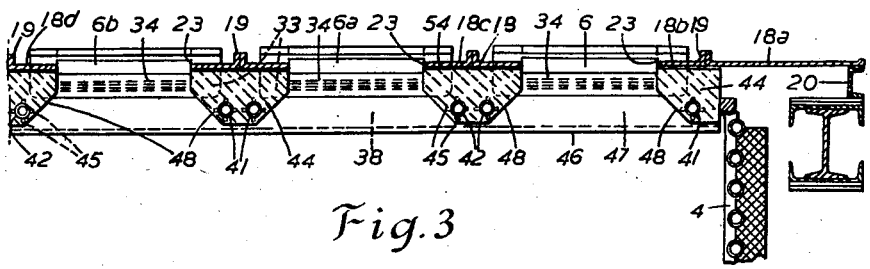
Figure 3 is a sectional plan view, taken on the line III—III of Figure 2 and showing certain structural members.
Figure 11:
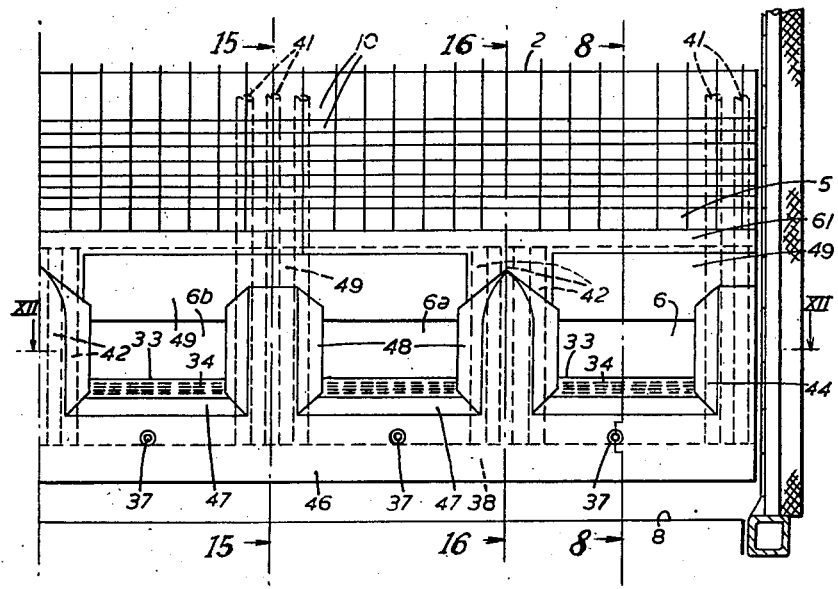
Figure 11 is a view similar to that of Figure 2, but showing another construction of front furnace wall.
Figure 12:
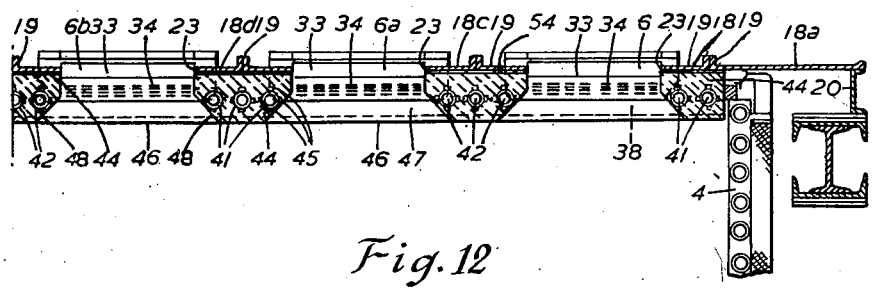
Figure 12 is a sectional plan view taken on the line XII—XII of Figure 11 and showing certain structural members.
Figure 4:
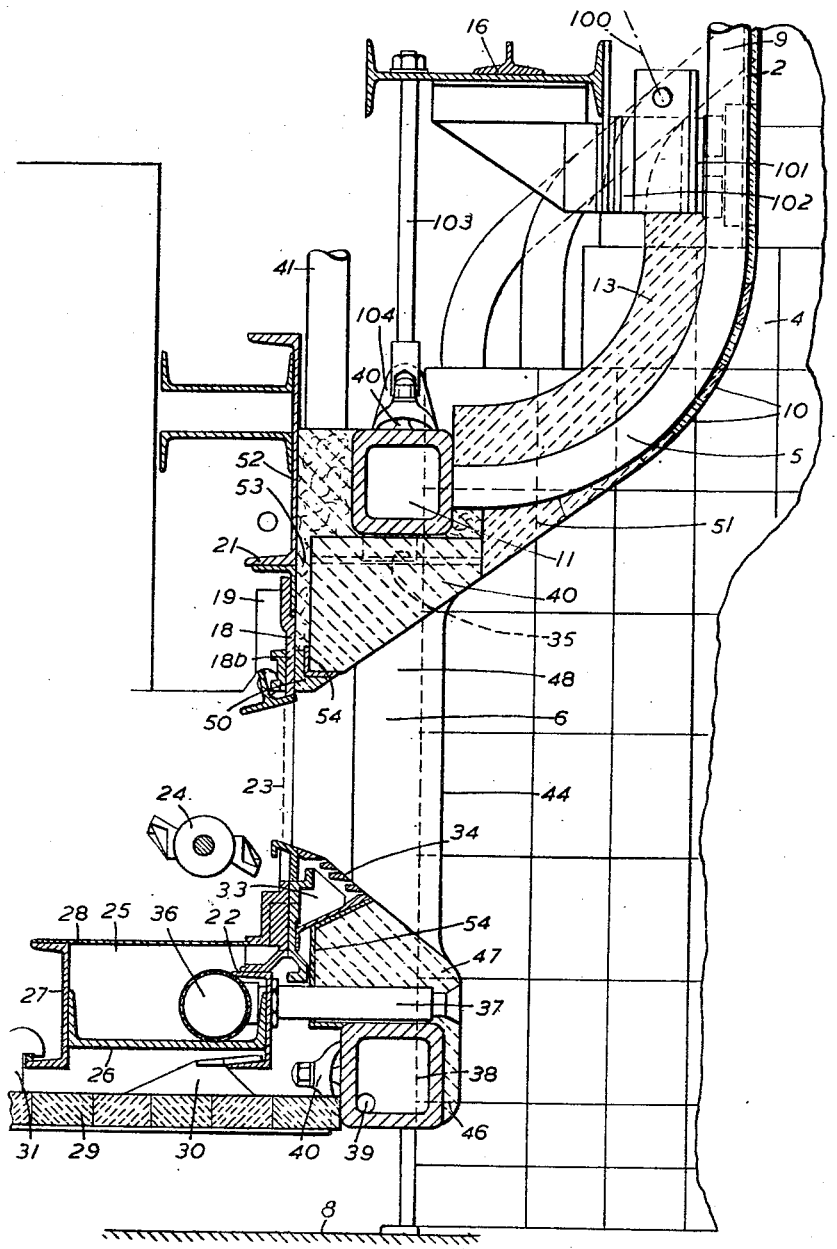
Figure 14:
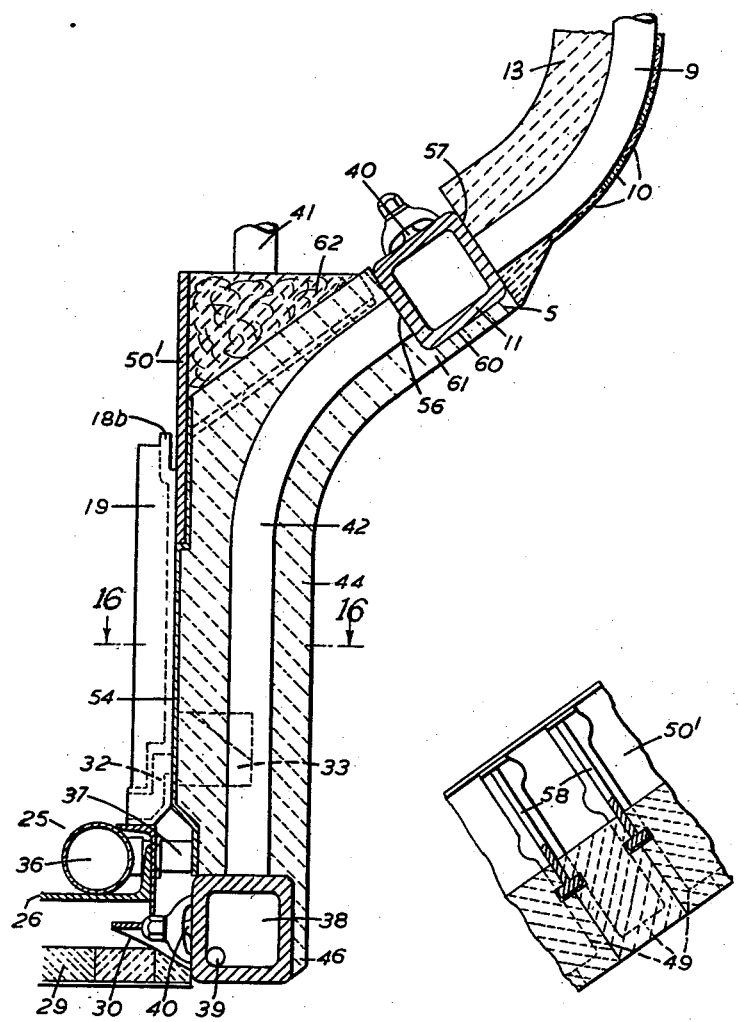

Referring more particularly to Figure 1 of the drawings, the furnace chamber 1 is formed with a front outer wall 2, a rear wall 3 and two opposite side walls 4, only one of which is seen. The front wall 2 includes an arch 5 below which are a series of openings 6, 6ª, 6ᵇ etc. Through the openings fuel distributor mechanism of suitable known construction is adapted to throw fuel delivered from a hopper 7 rearwardly across the furnace chamber and to distribute the fuel to an endless travelling grate 8 adapted to discharge the ashes from the fuel to a hopper below the front of the grate.

Above the series of openings, the front wall is water cooled by wall screening means comprising a row of tubes 9 covered by tube-supported wall blocks 10 and connected between lower and upper headers 11 and 12 of which the header 12 is suitably connected with a steam and water drum (not shown) of the boiler. The lower ends of the tubes 9 are bent to conform with the shape of the arch 5 and connect with the header 11 at the back thereof. The tubes 9 are covered by refractory insulating material 13 and are positioned by means including the structural elements 14, 15 and 16.

The rear wall 3 and the side walls 4 are also respectively water cooled by rows of tubes covered by wall blocks and by refractory insulating material, suitably supported and connected in the circulatory system of the boiler.

Above the furnace chamber 1 is an inclined bank of tubes 17 connected by risers and downcomers to the steam and water drum.

In the illustrated embodiments of the invention, as shown for the wall constructions of Figures 2 to 17, a steel plate 18 extends along the front of the furnace chamber a short distance above the grate. The plate is formed in section, such as the sections 18a, 18b, 18c, and 18d, secured together by bolts passing through side flanges 19 on the sections, which are properly supported by structural members including the elements 20, 21 and 22 and the plate assists in supporting various parts of the spreader stoker assembly.

In Figures 2, 3, 4 and 12 three openings 6, 6a and 6b are shown, and the sections 18b, 18c and 18d are similar to one another, each section being provided with an aperture 23 symmetrically arranged between the sides of the section and registering with an associated opening 6, 6a or 6b.

The fuel distributor means or mechanism includes bladed rotors 24 (see Figure 4) disposed in front of the openings 6, 6a, 6b etc. in the front wall and driving means comprising appropriate motors and gearing at the ends of the front wall. Suitable control means are associated with the rotors for determining the trajectories of the fuel particles, and the rate of feed of fuel through each opening may also be controlled.

Extending along the front of the furnace chamber below and forwardly of the openings is a low-pressure air duct 25 formed by structural elements 22, 26 and 27 and cover plate 28. The elements 22 and 27 also serve for the support of the roof 29 above the front end of the travelling grate 8 by the suspension members 30 and 31. Each section of the front plate 18 having an aperture 23 is formed at the lower part thereof and near its ends with passages 32 connecting the low-pressure air duct with the end portions of a box 33 helping to define the bottom of the opening with which the section is associated and extending somewhat beyond the sides of the opening. The portion of the box at the bottom of the opening is formed with a louver 34 for the discharge of primary air.

Within the low-pressure air duct 25 is a high-pressure air duct 36 extending from which are discharge tubes 37 adapted to deliver secondary air below the openings.

Running along the bottom of the front wall is a bottom header 38 formed with a wall drain 39. Suitably the headers 11 and 38 are both fitted with hand-hole fittings 40. The header 38 is arranged to receive water from the steam and water drum of the boiler, through downcomer tubes 41 connected in suitable known manner with the water space of the drum, and, in the embodiments illustrated in Figures 2 to 23, to distribute the water to riser tube lengths 42 connected between the header 38 and the header 11. In all the figures, except Figure 24, the whole of the water supplied to the riser tube lengths constituted by the tubes 9 above the openings is supplied through the downcomer tubes 41, the header 38 and the riser tube lengths 42.

In the embodiment of the invention illustrated in Figures 2 to 7 of the drawings, the downcomer tubes 41 are positioned laterally by guides 43 welded to the header 11. The header 11 is immediately above the header 38 and the straight riser tube lengths 42 serve to suspend the header 38 from the header 11.

The upper portion of front wall 2 is suspended by a number of links 100 respectively connected with plates 101 bolted to the wall blocks and held to the structural element 16 by anchor members 102 and suitable pin and slot connections between the plates 101 and anchor members 102 which permit, within limits, vertical or lateral movements of the plates 101 relatively to the structural element 16, but prevent movement thereof in a forward or rearward direction.

The header 11 is also supported by suspension links 103, acting between plates 104 welded to the header and the structural element 16, and the header 38 is held by horizontal tie links to the structural element 26, the links being omitted from the drawings for the sake of clarity. Immediately below the header 11 the downcomer tubes 41 are bent to bring them into the space between the headers with the lower extremities of the tubes in alignment with the riser tube lengths 42.

The downcomer tubes 41 and the riser tube lengths 42 are so grouped that alternate regions at the sides of the openings are screened by riser tube lengths and the remaining regions are screened by downcomer tubes. Thus, at the outer side of the opening 6 is a single downcomer tube 41, between the openings 6 and 6a are two riser tube lengths 42 and between the openings 6a and 6b are two downcomer tubes 41.

The riser tube lengths 42 and the parts of the downcomer tubes extending at the sides of the openings are covered by refractory material 44 of the kind applied while in plastic condition, the tubes being provided with studs 45 to which the material is keyed. The refractory material is also applied as a side covering 46 to the rear of the header 38 and as an upper covering 47 to the top of the header. The covering 47 together with the louvers 34 form the bottoms of the openings. The sides of the openings formed by the refractory material 44 are made with bevels 48 in order to permit the desired angular spread of the fuel passing through the openings. The tops and bottoms of the openings also flare rearwardly and the tops are defined by refractory bricks 49 hung on T-pieces 35 welded to the header 11 and positioned below the header by the angle 50 secured to the plate 18 and by the downward extensions 51 of the lowermost blocks 10. The spaces between the header 11 and structural element 52, between the bricks 49 and the structural elements 21 and 52 and plate 18 and between the header and the lowermost block are filled with asbestos fibre 53 and asbestos or other suitable packing 54 is provided between the bricks 49 and angle 50 and between the refractory material 44 and also the upper covering 47 and fixed members such as the plate 18 or the boxes 33 abutting thereagainst, in order to permit, during operation, slight relative movements between the refractory parts and the fixed metal parts.

In operation, water from the steam and water drum is fed through the downcomer tubes 41 to the header 38 and is heated on its way to the header only while passing through the parts of the downcomer tubes adjacent the openings. The whole of the fluid which flows through the row of tubes 9 is thus fed to the header 38 and passes from that header to the header 11 through the riser tube lengths 42. The front wall adjacent the openings is therefore adequately cooled so that the wall is able to operate for long periods without attention. At the same time the spreader stroker is installed and may be operated and controlled in normal manner.

The embodiment of the invention illustrated by Figures 8, 9 and 10 differs from that illustrated by Figures 2 to 7 in that the header 11 instead of being immediately above the header 38 is displaced rearwardly relatively thereto and that the riser tube lengths 42 near their upper ends are bent rearwardly to connect with the header 11, as shown by Figure 9. The downcomer tubes 41 are also bent to bring their lower extremities into line with the lower parts of the riser tube lengths 42.

With the arrangement described, the riser tube lengths 42 and the lower extremities of the downcomer tubes 41 are further forward relative to the furnace face of those parts of the front wall between the openings than is the case with the embodiment illustrated in Figures 2 to 7, with the result that, with the same spacing between the openings and the same thickness of wall and bevels at the sides of the openings, three riser tube lengths or downcomer tubes may be accommodated in alignment between adjacent openings. In order to allow sufficient space for the riser tube lengths or downcomer tubes between adjacent boxes 33, the ends of the boxes may be inclined as will be understood by reference to Figure 16.

In Figures 11 to 17 two downcomer tubes 41 are provided at the outer side of the opening 6, three riser tube lengths 42 are disposed between the openings 6 and 6ª, three downcomer tubes 41 are disposed between the openings 6ª and 6ᵇ, and so on.

In order to accommodate the three riser tube lengths or the three downcomer tubes between openings, the ends 55 of the boxes 33 are inclined, as shown by Figure 16.

The header 11 is set rearwardly of the header 38 and is positioned with its sides inclined, and the riser tube lengths 42 towards their upper ends are bent rearwardly and enter the lower side 56 of the header normal to that side and the tubes 9 extend normally from the upper side 57 of the header, the lower extremities of the tubes being curved to bring the tubes into a vertical plane. The downcomer tubes 41 are straight and are positioned some distance in front of the header 11.

The refractory bricks 49 extend both above the openings and in front of the downcomer tubes and are suspended from brackets 58 clamped to the angle member 50', as shown in Figure 17. The uppermost bricks 49 abut against the header 11 and above each opening each lowermost brick abuts against the angle member 50', whilst in front of each set of downcomer tubes 41 the lowermost bricks abut against the inclined surface 59 of the refractory material 44. The side 60 of the header 11 is covered with refractory material 61, applied to the level of the adjacent edges of the lowermost blocks 10 and bricks 49 which project beyond the side 60, and insulating material 62, such as asbestos fibre, fills the space between the angle member 50' and the bricks 49 or refractory material 44. Packing 54 is used as in the previous embodiments described.

If desired, whether the upper header is immediately above the lower header or is placed relatively to the latter in a rearward direction, the downcomer tubes or some of them may extend downwardly past the back of the upper header between the lower ends of the riser tube lengths included in the screening means above the openings. This is easily accomplished when the said tube lengths are bare.

Thus, in Figure 18, the header 11 is immediately above the header 38 and the riser tube lengths 42 are straight; the lower ends of the tubes 9 are bent so that the extremities of the tubes extend normally from the rear side of the header 11; and the downcomer tubes 41 extend downwardly behind the header 11 and between the tubes 9, and adjacent the header 11 are so bent that the lower ends of the tubes are normal to the upper side of the header 38 and are in alignment with the riser tube lengths 42.

In Figure 19, a header 11 circular in cross-section is disposed immediately above a header 38 of square cross-section and the downcomer tubes 41 pass through the header 11, the passage of the downcomer tubes through the header being effected by means of ferrules 65 extending through and expanded into diametrically opposite holes in the header 11, each ferrule being welded to the associated portions of a downcomer tube above and below the header. In this embodiment both the riser tube lengths 42 and the portions of the downcomer tubes 41 between the headers 11 and 38 are straight.

If desired, downcomer tubes may be arranged to deliver liquid to the header below the openings in the vicinity of riser tube lengths, by forming at the sides of openings groups including at least one downcomer tube length and at least one riser tube length.

In Figure 20, for example, between the openings 6ª and 6ᵇ is a group formed of two downcomer tubes 41 and an intermediate riser tube length 42; between the openings 6ᵇ and 6ᶜ is a group formed of two riser tube lengths 42 and an intermediate downcomer tube 41 and on the side of the opening 6ᶜ remote from the opening 6ᵇ is a group formed of two downcomer tubes 41 and an intermediate riser tube length 42. The header 11 is immediately above the header 38, the riser tube lengths 42 are straight and the downcomer tubes 41 extend downwardly in front of the header 11 and are bent adjacent to the header to bring their lower ends into alignment with the riser tube lengths.

Figure 21:
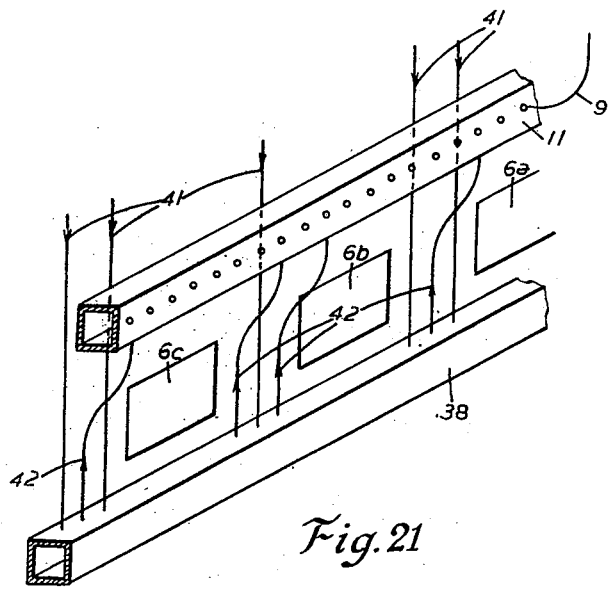

Figure 21 is similar to Figure 20, but the header 11 is set rearwardly of the header 38, the downcomer tubes 41 are straight and the riser tube lengths 42 are bent so that the upper ends thereof are normal to the underside of the header 11.

Figure 22:
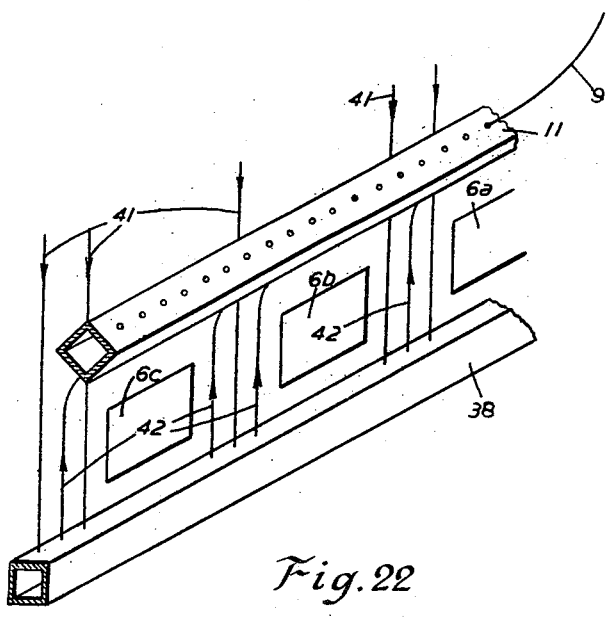

Figure 22 is also similar to Figure 20, but the header 11 is set rearwardly of the header 38 and its sides are inclined, the downcomer tubes 41 being straight and the riser tube lengths 42 and the tubes 9 being bent so that their ends are normal to the respective sides of the header 11 into which the ends are expanded.

Figure 23:
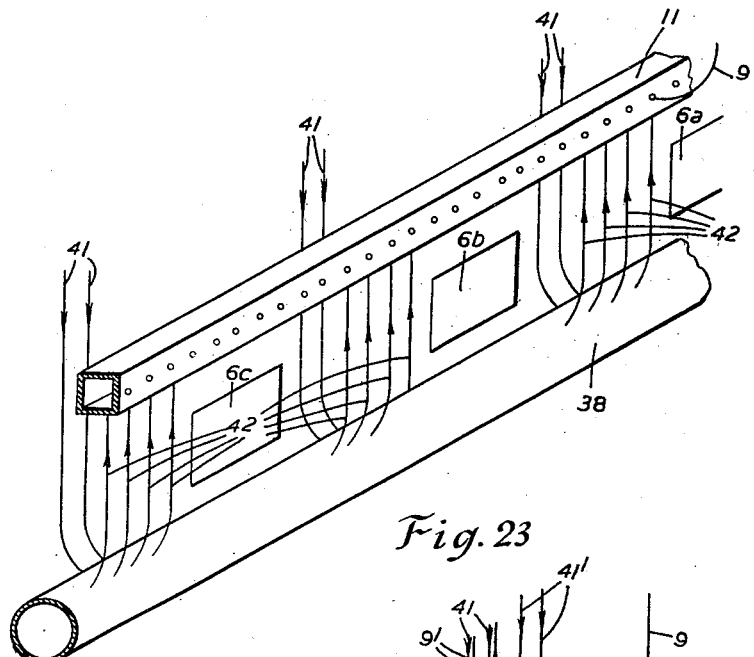

Figure 23 illustrates how riser tube lengths at the sides of openings may be arranged to screen from the furnace chamber the lower parts of downcomer tubes at the sides of the openings. Thus, below a header 11 of square cross-section is arranged a header 38 circular in cross-section and at either side of each opening 6ª, 6ᵇ and 6ᶜ two downcomer tubes 41 extend downwardly in front of the header 11 and four riser tube lengths 42 are positioned behind the pair of downcomer tubes. The lower extremities of the downcomer tubes and of the riser tube lengths are curved so as to extend radially from the header 38. Suitably, the riser tube lengths 42 are studded and covered with refractory material which may also cover the lower ends of the downcomer tubes 41.

Figure 24:
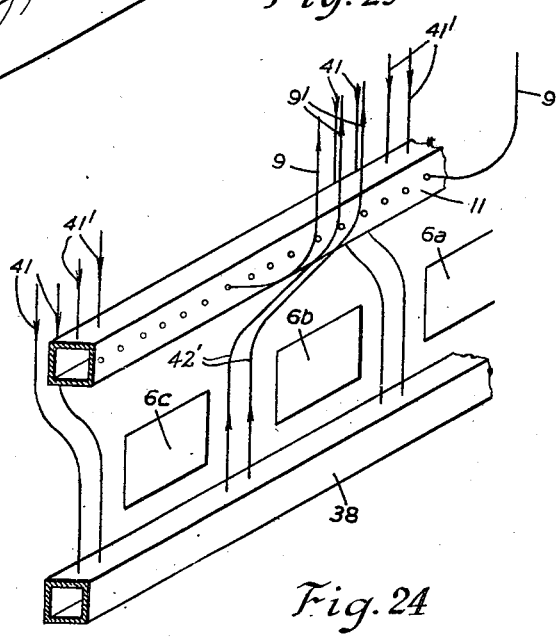

In Figure 24, the riser tube lengths 42' instead of being connected to the upper header 11 are formed in one with tubes 9' constituting riser tube lengths above the openings, the header 38 is supplied with water through the downcomer tubes 41 and the header 11 is separately supplied with water through the downcomer tubes 41'. The header 11 is immediately above the header 38 and the downcomer tubes 41 extend downwardly in front of the header 11 and are bent adjacent to that header to bring the lower extremities of the tubes into the space between the headers and into alignment with the lower parts of the riser tube lengths 42'. The tubes 9' take the place of corresponding tubes omitted from the row of tubes 9 and the vertical parts of the tubes 9 and 9' are in alignment. The lower ends of the tubes 9 are bent to extend normally from the rear side of the header 11 and the lower ends of the tubes 9' are bent to conform as far as possible to the curvature of the lower ends of the tubes 9 and to merge adjacent the back of the header 11 into the upper ends of the riser tube lengths 42' the upper ends of which are bent rearwardly.

In operation, the water supplied through the downcomer tubes 41 to the header 38 is distributed to the riser tube lengths 42' and flows through those tube lengths and the tubes 9' to the header at the top of the front water tube wall; and the water supplied through the downcomer tubes 41' to the header 11 is distributed to the tubes 9 and flows through those tubes also to the header at the top of the front water tube wall.

If desired, instead of using a single header 11, a plurality of headers, each supplied by downcomer tubes, may be provided, the tubes 9' being adjacent to ends of the headers.

The lower ends of the downcomer tubes and the riser tube lengths at the sides of the openings have been described as being covered by refractory material, but naturally any suitable construction may be adopted and in proper circumstances a bare tube construction may be used.

Having now particularly described and ascertained the nature of our said invention and in what manner the same is to be performed, we declare that what we claim is:

1. A furnace chamber having an upright wall formed with horizontally spaced openings in a lower portion thereof for the passage into the chamber of fuel thrown by fuel distributor mechanism of a spreader stoker and which is provided with tubular liquid cooled wall screening means adapted to operate with natural circulation of the cooling medium and extending at the sides of as well as above the openings, said screening means comprising one header means above said openings and separate bottom header means below said openings and each extending horizontally throughout a distance spanning wall regions at opposite sides of a plurality of said openings, downcomer tubes extending downwardly from positions exteriorly of said chamber to positions within said wall at sides of said openings, said downcomer tubes upon entering said wall continuing downwardly past said one header means and having their lower extremities connected to said bottom header means, and riser means comprising riser tube lengths extending at sides of said openings together with riser tube lengths extending above said openings and distributed throughout wall portions directly above said openings, said riser tube lengths at said sides having their lower extremities connected to said bottom header means and said riser tube lengths above said openings comprising tube lengths having their lower ends connected to said one header means, said downcomer tubes and riser tube lengths at said sides extending upright between the inner and outer faces of said wall throughout the height of said openings.

2. A furnace chamber having an upright wall formed with horizontally spaced openings in a lower portion thereof for the passage into the chamber of fuel thrown by fuel distributor mechanism of a spreader stoker and which is provided with tubular liquid cooled wall screening means adapted to operate with natural circulation of the cooling medium and extending at the sides of as well as above the openings, said screening means comprising upper header means above said openings and separate bottom header means below said openings and each extending horizontally throughout a distance spanning wall regions at opposite sides of a plurality of said openings, downcomer means comprising upper tube portions arranged exteriorly of said chamber at positions above said openings and lower tube portions arranged to receive fluid from said upper tube portions and extending downwardly within said wall at sides of said openings, said lower tube portions having their lower extremities connected to said bottom header means, and riser means comprising riser tube portions extending at sides of said openings together with riser tube portions extending above said openings, said riser tube portions at said sides having their lower extremities connected to said bottom header means and said riser tube portions above said openings comprising tube portions distributed throughout wall portions directly above said openings and having their lower ends connected to said upper header means, said downcomer lower tube portions at said sides extending upright between the inner and outer faces of said wall substantially throughout the height of said openings.

3. A furnace chamber as claimed in claim 2 wherein alternate regions at the sides of the openings are screened by riser tube portions and the remaining regions are screened by downcomer tube portions.

4. A furnace chamber as claimed in claim 2 comprising a tube group extending at a side of an opening and including the lower extremity of at least one downcomer tube portion and at least one riser tube portion.

5. A furnace chamber as claimed in claim 2 wherein riser tube portions extending at a side of an opening are arranged to screen from the furnace chamber a downcomer tube portion also extending at said side.

6. A furnace chamber as claimed in claim 2 wherein some of the riser tube portions above the openings form continuations of riser tube portions at sides of openings.

7. A furnace combustion chamber adapted to receive fuel thrown by spreader stoker means and having an upright wall formed with horizontally spaced openings for the passage into the chamber of such fuel, said wall including an upper portion formed as an arch extending inwardly and upwardly from said openings, and tubular wall cooling means associated with said wall and adapted to operate with natural circulation of a liquid cooling medium therethrough, said wall cooling means comprising tubular downcomer means and tubular riser means respectively including downcomer tube lengths and lower riser tube lengths restricted to lower wall regions at the sides of said openings and confined to portions of said wall inwardly of the outer face thereof, said downcomer tube lengths extending from positions exteriorly of said chamber and entering said wall at approximately the base of said arch, said riser tubes including upper riser tube lengths distributed throughout portions of said arch overlying said openings, said lower riser tube lengths having fluid inlet connections with said downcomer tube lengths and having fluid outlet connections with said upper riser tube lengths.

8. A furnace combustion chamber adapted to receive fuel thrown by spreader stoker means and having an upright wall formed with horizontally spaced openings for the passage into the chamber of such fuel, said wall including an upper portion formed as an arch extending inwardly and upwardly from said openings, and tubular wall cooling means associated with said wall and adapted to operate with natural circulation of a liquid cooling medium therethrough, said wall cooling means comprising tubular downcomer means and tubular riser means respectively including lower downcomer tube portions and lower riser tube portions restricted to lower wall regions at the sides of said openings and confined to portions of said wall inwardly of the outer face thereof at positions below said arch, said downcomer means including upper tube portions disposed exteriorly of said chamber at positions above said arch and arranged to supply fluid to said lower downcomer tube portions below said arch, said riser means including upper riser tube portions distributed throughout portions of said arch overlying said openings, said lower riser tube portions being arranged to receive fluid from said lower downcomer tube portions and to supply said fluid to said upper riser tube portions.

9. A furnace combustion chamber as claimed in claim 8 and further comprising bottom header means below said openings to which adjacent ends of said lower downcomer tube portions and lower riser tube portions are connected.

10. A furnace combustion chamber as claimed in claim 9 and further comprising header means above said openings to which adjacent ends of said lower and upper riser tube portions are connected.

11. A furnace combustion chamber as claimed in claim 10 wherein said downcomer tube portions are formed with upright portions extending downwardly to said bottom header means at the outer side of and past said header means above said openings, said downcomer tube portions being bent adjacent said last named header means so as to bring their lower portions within the wall throughout the height of said openings.

12. A furnace combustion chamber as claimed in claim 11 wherein said header means above said openings is positioned directly over said bottom header means and said lower riser tube portions connecting said header means are substantially straight and vertical and constitute means for suspending said bottom header means from said header means above said openings.

RICHARD HENRY EVANS.
LESLIE PERCY PURPLE.

REFERENCES CITED

The following references are of record in the file of this patent:

UNITED STATES PATENTS

| Number | Name | Date |
|---|---|---|
| 236,174 | Parvin et al. | Jan. 4, 1881 |
| 563,990 | Tetley | July 14, 1896 |
| 687,051 | McConnell | Nov. 19, 1901 |
| 864,752 | Knox | Aug. 27, 1907 |
| 1,456,205 | Worton | May 22, 1923 |
| 1,710,676 | Wolfe | Apr. 23, 1929 |
| 1,807,318 | Lundgren | May 26, 1931 |
| 1,926,707 | Wheeler | Sept. 12, 1933 |
| 1,953,768 | Murray | Apr. 3, 1934 |
| 1,986,663 | Bailey | Jan. 1, 1935 |
| 1,994,444 | Bailey | Mar. 12, 1935 |
| 2,134,000 | Mayo | Oct. 25, 1938 |
| 2,211,544 | McDonnell | Aug. 13, 1940 |
| 2,256,106 | Shellenberger | Sept. 16, 1941 |

FOREIGN PATENTS

| Number | Country | Date |
|---|---|---|
| 239,843 | Great Britain | Nov. 12, 1925 |